United States Patent
Ebrahimi Afrouzi et al.

(10) Patent No.: US 10,690,757 B1
(45) Date of Patent: Jun. 23, 2020

(54) METHOD AND APPARATUS FOR IMPROVING RANGE FINDING SYSTEM READINGS

(71) Applicants: Ali Ebrahimi Afrouzi, San Jose, CA (US); Chen Zhang, Dublin, CA (US); Sebastian Christopher Daub Schweigert, Oakland, CA (US)

(72) Inventors: Ali Ebrahimi Afrouzi, San Jose, CA (US); Chen Zhang, Dublin, CA (US); Sebastian Christopher Daub Schweigert, Oakland, CA (US)

(73) Assignee: AI Incorporated, Toronto (CA)

( * ) Notice: Subject to any disclaimer, the term of this patent is extended or adjusted under 35 U.S.C. 154(b) by 282 days.

(21) Appl. No.: 15/683,255

(22) Filed: Aug. 22, 2017

Related U.S. Application Data

(60) Provisional application No. 62/379,403, filed on Aug. 25, 2016.

(51) Int. Cl.
  *G01C 25/00* (2006.01)
  *G01S 7/497* (2006.01)
  *G01S 17/08* (2006.01)

(52) U.S. Cl.
  CPC .............. *G01S 7/497* (2013.01); *G01S 17/08* (2013.01)

(58) Field of Classification Search
  CPC ................................. G01S 7/497; G01S 17/08
  USPC ...... 702/97; 701/30.5, 31.1, 36, 301; 342/95
  See application file for complete search history.

(56) References Cited

U.S. PATENT DOCUMENTS

| | | | |
|---|---|---|---|
| 3,879,730 A * | 4/1975 | Arsem | G01S 13/70 342/95 |
| 7,813,851 B2 | 10/2010 | DeMersseman et al. | |
| 8,930,063 B2 | 1/2015 | Gandhi et al. | |
| 9,030,352 B2 | 5/2015 | Kenefic | |
| 9,366,751 B2 | 6/2016 | Steinbuch et al. | |
| 2009/0312906 A1 | 12/2009 | Bauer et al. | |
| 2010/0235129 A1 | 9/2010 | Sharma et al. | |

FOREIGN PATENT DOCUMENTS

DE    102015118085 A1    4/2017

* cited by examiner

*Primary Examiner* — John H Le

(57) ABSTRACT

A computer-implemented method for improving range finding system such as LIDAR, sonar, depth camera, and the like distance readings during instances when the range finding system is tilted. A range finding system continuously takes distance measurements to surfaces opposite the range finding system. As the range finding system is moved toward (or away from) stationary surfaces, a processor examines the successive measurements taken by the range finding system. If the measurements reflect a steady decline (or increase) in distances, readings will be accepted as normal and the system will continue to operate normally. If the measurements reflect a steady decline (or increase) in distances interrupted by measurements at least a predetermined amount or percentage greater than the measurements immediately before and after the interruption, the interrupting measurements are flagged and discarded.

10 Claims, 2 Drawing Sheets

METHOD AND APPARATUS FOR IMPROVING RANGE FINDING SYSTEM READINGS

CROSS-REFERENCE TO RELATED APPLICATIONS

This application claims the benefit of provisional patent application Ser. No. 62/379,403, filed Aug. 26, 2016 by the present inventor.

FIELD OF INVENTION

The present invention relates to remote measurement tools, and more particularly, to range finding systems.

BACKGROUND OF INVENTION

Range finding systems are used in a variety of settings to remotely obtain distance measurements. Many autonomous robotic devices use range finding systems such as Light Detection and Ranging (LIDAR), sonar, depth cameras, and the like systems to navigate environments and avoid obstacles. Range finding systems are also used to obtain data for generating maps of environments which may be used for navigation. During normal operation, a robotic device with a mounted range finding system drives on flat surfaces and obtains distance measurements to surfaces opposite the range finding system. However, range finding systems may deliver inaccurate distance measurements when tilted. Such instances may occur in cases where a range finding system is installed on a robotic device travelling over an obstacle before resuming movement on a flat surface. When tilted, the range finding system captures a few readings of distances to a point on the surface positioned at an angle other than the appropriate flat surface angle, thereby producing inaccurate readings. In prior art, sensor tilt has been predetermined for common obstacles to correct for measured ranges. However, this method requires calibration to determine sensor tilt for common obstacles and the robotic device may encounter obstacles unknown to the system. Prior art also describes a method whereby the angle of inclination or misalignment, calculated using different types of systems consisting of cameras and/or sensors, is used to adjust the distance measurements of the range finding system. However, this may only be applied if the tilt of the robotic device is uniform across the system and requires additional equipment. The present invention addresses these issues by introducing a more efficient system utilizing a computer-integrated method to identify and discard inaccurate range finding readings.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

It is a goal of the present invention to introduce a computer-implemented method for improving range finding system distance readings wherein distances may be obscured during instances when the LIDAR system is tilted during operation. Such instances may occur in cases where a range finding system is installed for example on a robotic device travelling over an obstacle before resuming movement on a flat surface.

The present invention achieves the above stated goal by taking distance measurement readings to surfaces opposite the range finding system at predetermined intervals. As the range finding system is moving towards stationary surfaces, a processor examines the successive measurements taken by the range finding system. If the measurements reflect a steady decline in distances occurring at a relatively constant rate, readings will be accepted as normal and the system will continue to operate normally. If the measurements reflect a steady decline in distances interrupted by no more than a predetermined number of measurements that are at least a predetermined amount or percentage greater than the measurements immediately before and after the interruption, the interrupting measurements shall be discarded and only the steadily declining measurements will be accepted as normal. In another case, as the range finding system is moving away from stationary surfaces, a processor examines the successive measurements taken by the range finding system. If the measurements reflect a steady increase in distances occurring at a relatively constant rate, readings will be accepted as normal and the system will continue to operate normally. If the measurements reflect a steady increase in distances interrupted by no more than a predetermined number of measurements that are at least a predetermined amount or percentage greater than the measurements immediately before and after the interruption, the interrupting measurements shall be discarded and only the steadily increasing measurements will be accepted as normal.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF THE INVENTION

Figure 1A:
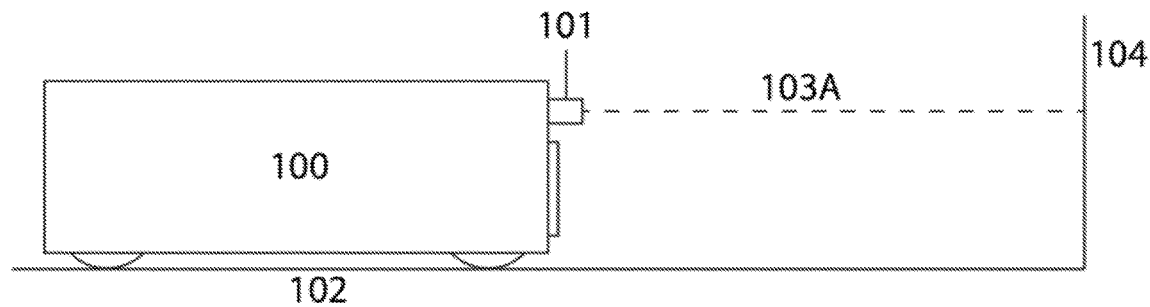
FIG. 1A illustrates a side view of an operating range finding system mounted on a robotic device driving on a flat surface embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As understood herein, the term "robot" or "robotic device" may be defined generally to include one or more autonomous or semi-autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor and/or controller that processes and/or controls motors and other robotic autonomous or cleaning operations, network or wireless communications, power management, etc., and one or more clock or synchronizing devices.

The present invention proposes a computer-implemented method to improve range finding system distance readings wherein distances may be obscured during instances when the range finding system is tilted. Such instances may occur in cases where a range finding system such as a LIDAR, sonar, depth camera, and the like system is installed for example on a robotic device travelling over an obstacle before resuming movement on a flat surface. In a first step, a range finding system takes distance measurement readings to surfaces opposite the range finding system at predetermined intervals. In a second step, which may occur simultaneously with the first step, the range finding system is moved relative to stationary surfaces. In a third step, which may occur while the first and second steps are still in process, a processor examines the successive measurements taken by the range finding system. If the measurements reflect a steady decline in distances occurring at a relatively constant rate, readings will be accepted as normal and the system will continue to operate normally. If the measurements reflect a steady decline in distances interrupted by no more than a predetermined number of measurements that are at least a predetermined amount or percentage greater than the measurements immediately before and after the interruption, the interrupting measurements shall be discarded and only the steadily declining measurements will be accepted as normal.

In another embodiment, the present invention proposes a computer-implemented method to improve range finding system distance readings wherein distances may be obscured during instances when the range finding system is tilted. Such instances may occur in cases where a range finding system is installed on a robotic device travelling over an obstacle before resuming movement on a flat surface. In a first step, a range finding system takes distance measurement readings to surfaces opposite the range finding system at predetermined intervals. In a second step, which may occur simultaneously with the first step, the range finding system is moving away from stationary surfaces. In a third step, which may occur while the first and second steps are still in process, a processor examines the successive measurements taken by the range finding system. If the measurements reflect a steady increase in distances occurring at a relatively constant rate, readings will be accepted as normal and the system will continue to operate normally. If the measurements reflect a steady increase in distances interrupted by no more than a predetermined number of measurements that are at least a predetermined amount or percentage greater than the measurements immediately before and after the interruption, the interrupting measurements shall be discarded and only the steadily increasing measurements will be accepted as normal.

The steps described above may be performed in various settings, such as with a range finding system installed on a robotic floor cleaning device.

Referring to FIG. 1A, a side view of robotic device 100 with a range finding system such as LIDAR 101 mounted is operating normally on flat surface 102 is illustrated. When the robotic device is operating on a flat surface, range finding emissions 103A are approximately parallel to working surface 102 and are used to survey the distance from the range finding system to surface 104 across from it. As the device moves along surface 102, it will survey surfaces in the same plane.

Figure 1B:
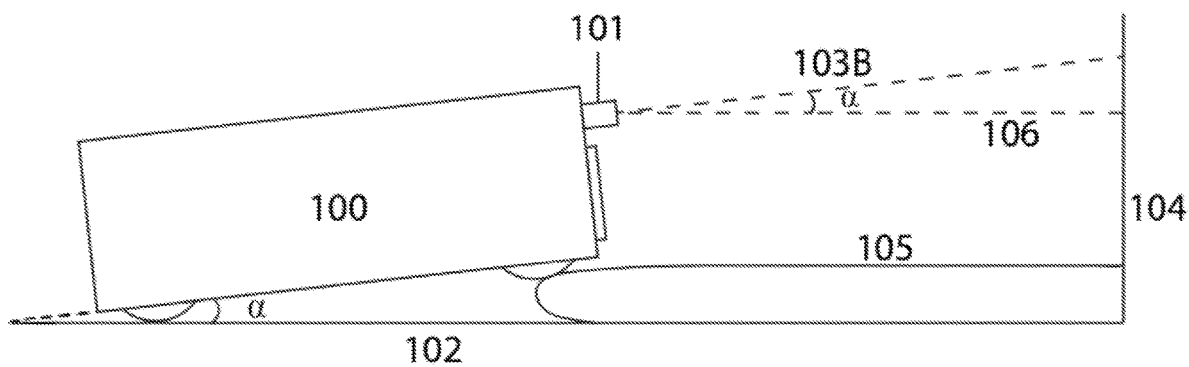
FIG. 1B illustrates a side view of an operating range finding system mounted on a robotic device driving over a surface obstacle embodying features of the present invention.

Referring to FIG. 1B, a side view of robotic device 100 with a range finding system such as a LIDAR system 101 mounted is driving onto obstacle 105 that is on work surface 102 is illustrated. Line 106 is parallel to work surface 102 and is provided for reference. Range finding emissions 103B are no longer parallel to work surface 102 and the range finding system captures distances greater than distance 106, which represents the horizontal distance from the range finding system to surface 104. Using the present method, this momentary increase in distances obtained by the range finding system would be flagged and discarded such that the readings are not used for navigation or mapping purposes.

Figure 2A:
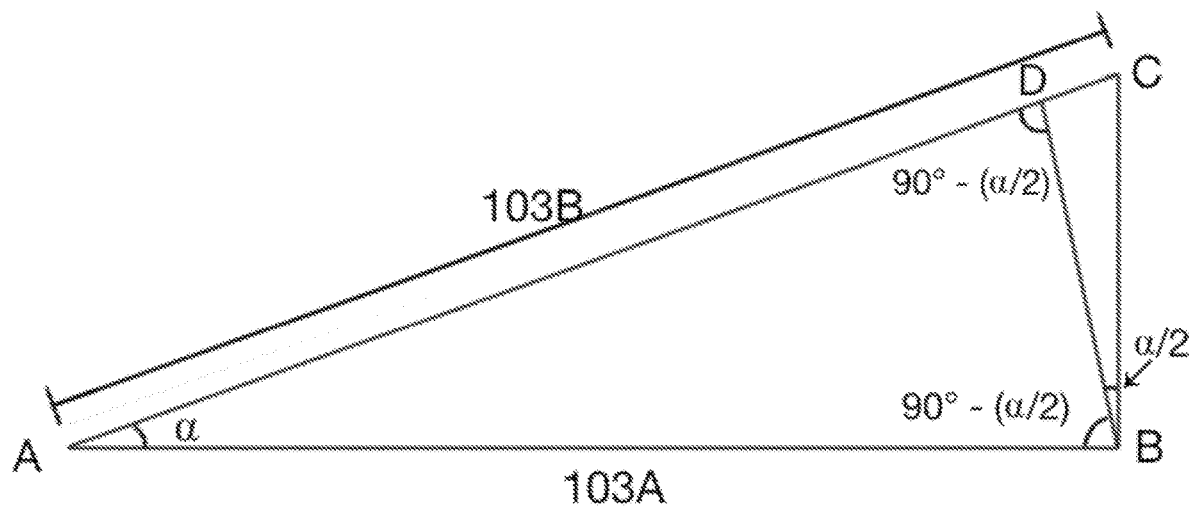
FIG. 2A shows the relationship between range finding system measurements during a normal operation of a robotic device and range finding system measurements when robotic device drives onto an obstacle.

Referring to FIG. 2A, some details of relationships between the range finding system's measurements 103A during a normal operation of a robotic device 100 and the range finding system's measurements 103B when a robotic device 100 drives onto an obstacle are presented. An interval DC presents the difference between range finding system-measured distances 103B when the robotic device 100 drives onto an obstacle and range finding system-measured distances 103A during a normal operation of the robotic device 100. Since intervals AD and AB are equal (where AB equals 103A, and AD+DC equals 103B in FIG. 2A), for interval DB it takes place, DB=AB sin α/cos(α/2) where AB equals 103A.

Figure 2B:
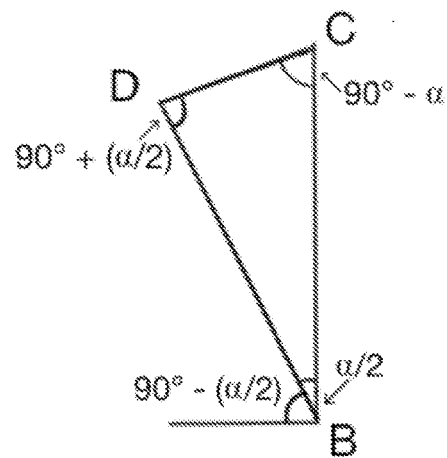
FIG. 2B presents details about range finding system-measured distances during a normal operation of a robotic device and range finding system-measured distances when a robotic device drives onto an obstacle.

Referring to FIG. 2B, more details of range finding system-measured distances 103A and range finding system-measured distances 103B are presented. These particulars help to evaluate the interval DC based on the distance 103A and the angle of elevation α.

It takes place, DC=AB(1−cos α)/cos α where AB equals 103A. It can be seen if angle α is small then interval DC is small too. When angle α equals 60° then intervals AD and DC are equal where AD equals 103A. When angle α approaches 90° then interval DC becomes unlimitedly large. It can be observed that interval DC that represents a range finding system measurement error is proportional to interval AB where AB equals 103A. Thus, errors are larger for big distances from a measured surface and the errors decrease when a robotic device approaches the surface. This observation makes it possible to perform monitoring of range finding system measurement more often at the larger distances from a robotic device to the surface and less often at the shorter distances to the surface. Another consequence allows making a threshold for range finding system measurement bigger at the larger distances from a robotic device to the surface and smaller at the shorter distances to the surface.

The method proposed herein may be used to measure the length of the obstacle in the direction of movement of the robotic device by identifying the distance of the range finding system immediately before and after encountering the obstacle, signified by detected interruptions, and finding the absolute difference between the two distance measurements.

The method proposed may be used with a robotic device's range finding systems containing additional instrumentation for measuring 2D position to determine the position of obstacles by identifying the positions of the range finding system immediately before and after encountering the obstacle, signified by detected interruptions.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

We claim:

1. A method for culling out inaccurate range finding system measurements and improving accuracy of range finding system measurements comprising:
    taking distance measurements with a range finding system to surfaces opposite the range finding system at predetermined intervals;
    moving the range finding system relative to the surfaces;
    monitoring the distance measurements taken by the range finding system; and,
    discarding measurements that reflect an interruption of no more than a predetermined number of measurements within a series of otherwise steadily declining measurements, the interrupting measurements being at least a predetermined amount or percentage greater than the measurements immediately preceding and following the interruption,
    wherein the range finding system comprises instrumentation for measuring two dimensional position to determine positions of obstacles by identifying a position of the range finding system immediately before and after encountering the obstacles, signified by the interruptions detected in the distance measurements.

2. The method of claim 1, wherein the method may be used to measure a length of an obstacle in the direction of movement of the robotic device by identifying the distance of the range finding system immediately before and after encountering the obstacle, signified by the interruptions detected in the distance measurements, and finding the absolute difference between the two distance measurements.

3. The method of claim 1, wherein the predetermined intervals are time intervals.

4. The method of claim 1, wherein the predetermined intervals are distance intervals.

5. The method of claim 1, wherein the positions of obstacles are recorded such that obstacles are avoided at a later time.

6. A method for improving accuracy of range finding systems comprising, in the following order:
    taking distance measurements with a range finding system to surfaces opposite the range finding system at predetermined intervals;
    moving the range finding system towards or away from the surfaces;
    examining the distance measurements taken by the range finding system; and,
    discarding measurements that reflect an interruption of no more than a predetermined number of measurements within a series of otherwise steadily increasing measurements, the interrupting measurements being at least a predetermined amount or percentage greater than the measurements immediately preceding and following the interruption,
    wherein the range finding system comprises instrumentation for measuring two dimensional position to determine positions of obstacles by identifying a position of the range finding system immediately before and after encountering the obstacles, signified by the interruptions detected in the distance measurements.

7. The method of claim 6, wherein the method may be used to measure a length of an obstacle in the direction of movement of the robotic device by identifying the distance of the range finding system immediately before and after encountering the obstacle, signified by the interruptions detected in the distance measurements, and finding the absolute difference between the two distance measurements.

8. The method of claim 6, wherein the positions of obstacles are recorded such that the obstacles are avoided at a later time.

9. The method of claim 6, wherein the predetermined intervals are time intervals.

10. The method of claim 6, wherein the predetermined intervals are distance intervals.

* * * * *